United States Patent [19]

Okuzumi

[11] Patent Number: 4,934,730
[45] Date of Patent: Jun. 19, 1990

[54] FRONT SUSPENSION FOR A WHEELED MOTOR VEHICLE

[75] Inventor: Hiroshi Okuzumi, Yokosuka, Japan

[73] Assignee: Nissan Motor co., Ltd., Yokohama, Japan

[21] Appl. No.: 304,077

[22] Filed: Jan. 31, 1989

[30] Foreign Application Priority Data

Feb. 2, 1988 [JP] Japan .................................. 63-22601

[51] Int. Cl.⁵ ................................................ B60G 1/00
[52] U.S. Cl. ..................................................... 280/668
[58] Field of Search ......................................... 280/668

[56] References Cited

U.S. PATENT DOCUMENTS 4,482,135  11/1984  Ishida et al. ........................ 280/668
4,817,983   4/1989  Virani .................................. 280/668

FOREIGN PATENT DOCUMENTS 105232   4/1984  European Pat. Off. .
2158549  11/1985  United Kingdom .

Primary Examiner—Kenneth R. Rice
Attorney, Agent, or Firm—Foley & Lardner, Schwartz, Jeffery, Schwaab, Mack, Blumenthal & Evans

[57] ABSTRACT

A front suspension of the strut type is modified according to the present invention such that an upper end part of a shock absorber, namely a piston rod, is engaged in an inner sleeve of a mount insulator for a limited axial movement relative to the inner sleeve. The shock absorber also includes a lower end part linked to a wheel support member. When the shock absorber sticks, the upper end part of the shock absorber displaces relative to the mount insulator and thus a spring operatively disposed between the wheel support member and the mount insulator works to dampen the axial load between the mount insulator and the wheel support member. Thus, when an engine idles, the vehicle vibration induced by a roll force from the engine does not resonate with the engine vibration.

6 Claims, 6 Drawing Sheets $(K_1 \gg K_3 \gg K_2)$ $K_1 \gg K_3$

FRONT SUSPENSION FOR A WHEELED MOTOR VEHICLE

BACKGROUND OF THE INVENTION

The present invention relates to a improvement in a front suspension of the strut type of a wheeled motor vehicle with an engine mounted under a front engine hood such as to provide an arrangement whereby the level of vibrations of the wheeled motor vehicle are reduced. These vibrations are induced by a torque variation produced by the engine at idling due to irregular combustion occurring in the engine. More particularly, the present invention relates to a front suspension arrangement whereby the roll resonance frequency of the vehicle induced by a vibration inducing force applied to the vehicle by the engine is deviated from the frequency of the vibration inducing force, thereby, reducing the level of vibrations of the vehicle when the engine idles.

There is known a front suspension of the strut type as shown in FIG. 4 (refer to Page 22 of SERVICE PERIODICAL NO. 491 III, published by NISSAN MOTOR COMPANY LIMITED on Oct., 1983). This front suspension is used in an automobile powered by a diesel engine.

Referring to FIG. 4, what is generally denoted by the reference numeral 1 is a shock absorber used as a strut. The shock absorber 1 comprises an outer cylindrical column 2 having a lower end linked to a wheel support member, not shown, and a piston rod 3 telescopically received in the outer cylindrical column 2 and projecting upwardly. The piston rod 3 of the shock absorber 1 has an upper end fixedly fit in an inner race 4a of a ball bearing 4 having an outer race 4b fixedly fit in an inner sleeve 5a of a mount insulator 5. The mount insulator 5 comprises the inner sleeve 5a, an outer sleeve 5b that is fixedly secured via a bracket 6 to a vehicle body, not shown, and an elastic body 5c loaded between the inner and outer sleeves 5a and 5b. The elasic body 5c is subject to a shearing stress and elastically deforms in a shearing direction when the inner and outer sleeves 5a and 5b are subject to vibrations or impacts during running of a vehicle. The reference numeral 7 denotes a spring operatively disposed between the outer cylindrical column 2 and the mount insulator 5.

However, with this conventional front suspension, the level of vibrations of the automobile becomes considerably high when the engine is subject to irregular combustion at idling.

This phenomenon taking place in the diesel engine is now described. Since combustion pressure in each of the cylinders of the diesel engine varies with the amount of intake air and amount of fuel injection, there occurs a variation in effective pressure between the cylinders as shown in FIG. 5. This torque variation produced by the engine occurs once in every two crankshaft revolutions of the engine. Thus, the main component of vibration of the engine is of the 0.5 th order component of engine revolution speed. This vibration of the engine E is applied, as a roll input force T, via an engine amount $K_M$ to the vehicle body B, causing the vehicle body B to vibrate about its rolling axis in a $\theta$ direction as shown in FIG. 7. The frequency range of the 0.5 th order component of the engine vibration is from 5 Hz to 6 Hz when the engine idles at an idling speed falling in a range from 600 to 720 rpm. According to the known suspension, the shock absorber 1 sticks at small vibrations ranging from 5 to 10 Hz. Thus, under this condition, a spring force which the roll input force T is applied to the vehicle body B is determined by the relationship ($K_3 < K_1$) between a spring constant $K_1$ of the mount insulator 5 and a vertical spring constant $K_3$ of the tire and thus approximately equal to $K_3$, so that a resonance frequency of vibration of the vehicle body B induced by the roll input force T comes into agreement with the frequency of the 0.5 th order component of the engine vibration. This results in an increased level of vibration of the vehicle body (refer to FIGS. 9 and 10) when the engine idles.

Accordingly, an object of the present invention is to reduce the level of vibrations of a wheeled motor vehicle at engine idling.

A specific object of the present invention is to provide a front suspension of the strut type which is improved such that a resonance frequency of vibration of a vehicle body induced by a roll input force does not come into agreement with a frequency of the 0.5 th order component of vibration of an engine when the engine idles.

SUMMARY OF THE INVENTION

According to the present invention, there is provided a wheeled motor vehicle having a vehicle body, a front mount engine, and front wheels, and a front suspension of the strut type operatively connected between a wheel support member for each of the front wheels and the vehicle body. The front suspension of the strut type comprises, a mount insulator on the vehicle body, a shock absorber having a lower end part linked to the wheel support member, and an upper end part telescopically received in said lower end part, a spring operatively disposed between the wheel support member and said mount insulator, and means for engaging said upper end part with the mount insulator in such a manner as to allow a limited axial displacement of said upper end part relative to said mount insulator.

More specifically, owing to the engaging means, the upper end part of the shock absorber is engaged with an inner sleeve of the mount insultor such that the upper end part is displaceable relative to the inner sleeve. Therefore, since the mount insulator that is made of rubber or the like with high rigidity and the upper end part of the shock absorber are not linked in an axial rigid manner, a spring force with a roll input is applied to the vehicle body is not determined singularly by the vertical spring constant of the because the displacement of the mount insulator relative to the upper end part of the shock absorber is allowed upon receiving the roll input force from the engine. According to this arrangement, the roll resonance frequency of vibration of the vehicle is lowered because of a spring which is operatively disposed between the wheel support member and the mount insulator and has a small spring constant so that the roll resonance frequency of the vehicle body does not come into agreement with the frequency of the 0.5 th component of vibration of the engine at idling speed. As a result, the level of vibration of the vehicle is considerably reduced when the engine idles.

BRIEF DESCRIPTION OF THE DRAWINGS

FIGS. 5 and 6 are graphs used to explain vibration inducing force of the 0.5 th order generating mechanism, wherein FIG. 5 is a graph plotting effective pressure Pi of each of six cylinders of a diesel engine, and FIG. 6 is a graph showing the frequency components of the torque variation of the engine which induces vibration;

FIGS. 9 and 10 are graphs used to explain a vehicle vibration generating mechanism of the 0.5 th order when the engine idles, wherein FIG. 9 is a graph showing frequency components of vibration inducing torque, and FIG. 10 is a graph showing frequency components of vibration of a vehicle body.

DETAILED DESCRIPTION OF THE INVENTION

Referring to the accompanying drawings, an embodiment according to the present invention is described.

Figure 1:
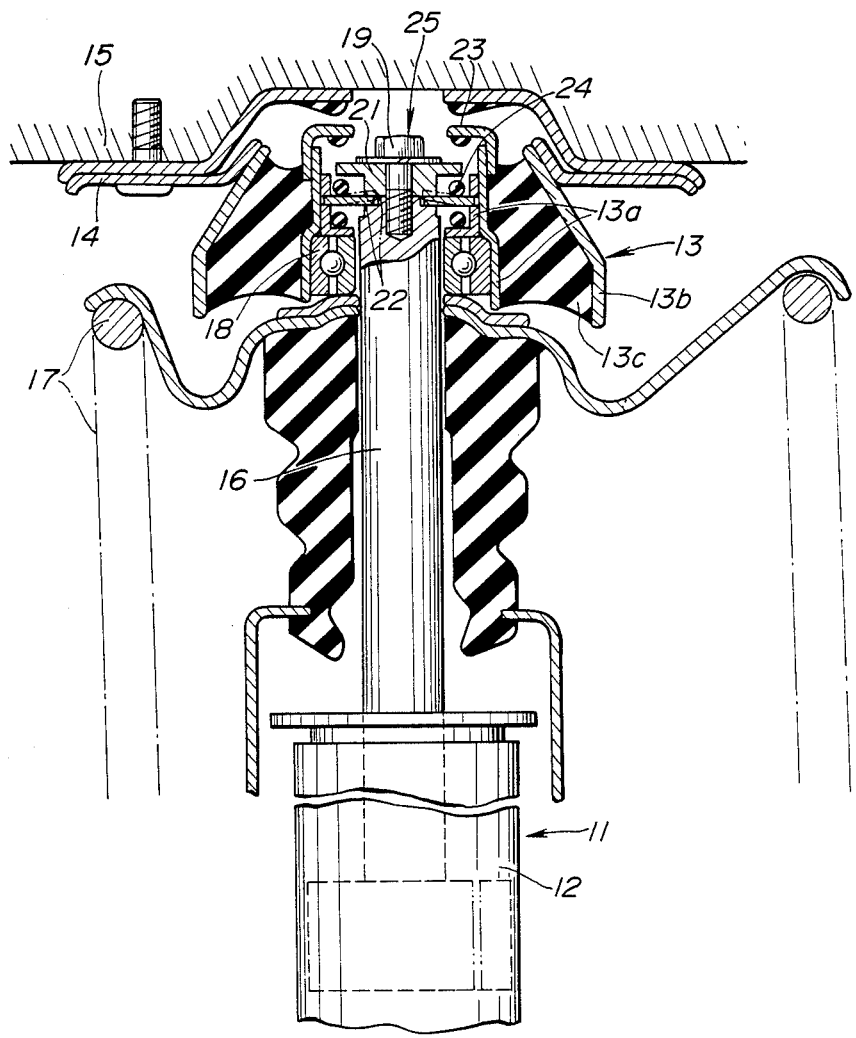
FIG. 1 is a fragmentary sectional view of a front suspension of an automobile with an engine mounted in front of a passenger compartment of the vehicles.

In FIG. 1, the reference numberal 11 denotes a shock absorber used as a strut. The shock absorber 11 comprises an outer cylindrical column 12, namely a lower end side member, having a lower end, as viewed in FIG. 1, linked to a wheel supporting member such as a knuckle spindle (not shown), and a piston rod 16, namely an upper end side member, linked to a vehicle body 15 via a mount insulator 13 and a bracket 14. The piston rod 16 is slidably received in the outer cylindrical column 12 and projects upwardly from the outer cylindrical column 12. Thus, the outer cylindrical column 12 and the piston rod 16 exibit a damping force during their relative displacement in an axial direction, and they cooperate with a spring 17 operatively disposed between the outer cylindrical column 12 and the mount insulator 13 to damper a load transmitted to the vehicle body from the wheel supporting member. The mount insulator 13 comprises an inner sleeve 13a, an outer sleeve 13b secured to a bracket 14, and a elastic body 13c, such as a rubber, loaded between the inner and outer sleeves. The upper end of the piston rod 16 is axially inserted in the inner sleeve member 13a of the mount insulator 13 via a bearing 18.

Figure 2:
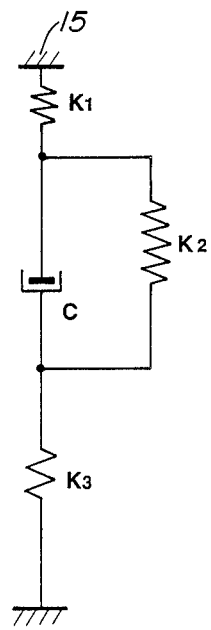
FIG. 2 is a kinetic model of the front suspension.

With a bolt 19, a flanged member 21 is securely attached to an upper end of the piston rod 16 with a disc in the form of an initially coned disc spring 22 interposed between the flanged member 21 and the upper end of the piston rod 16. The disc spring 22 has an inner periphery interposed between the flanged member 21 and the upper end of the piston rod 16 for an unitary axial movement with the piston rod 16 and an outer periphery engaged in the mount insulator 13 for an unitary movement with the inner sleeve 13a. The disc spring 22 which is initially coned is easily flattened when it is subject to a relatively small axial load transmtted via the inner sleeve 13a of the mount insulator 13 or the piston rod 16, allowing a relative axial displacement between the mount insulator 13 and the piston rod 16. When, owing to the application of a relatively large load, this relative axial displacement between the mount insulator 13 and the piston rod 16 exceeds a predetermined amount, the flanged member 21 comes into abutting engagement with an inwardly curled stop 23 fixedly secured to the inner sleeve 13a of the mount insulator 13 or with the inner sleeve 13a via an annular elastomer 24 at the outer periphery portion of the disc spring 22, causing the shock absorber 11 to reveal its damping function. From the preceding description, it is now appreciated that the inner sleeve 13a of the amount insulator 13, flanged member 21, initially coned disc spring 22, stop 23, and annular elastomer 24 cooperate with each other to form engaging means for engaging the piston rod 16 with the mount insulator 13 so that axial relative displacement between the mount insulator 13 and the piston rod 16 is allowed. FIG. 2 is a kinetic model of the construction of the embodiment according to the present invention. This model illustrates that the present embodiment comprises the mount insulator 13 having a spring constant $K_1$ ($K_1 = \alpha$ to 70 Kgf/mm), the shock absorber 11 having a damping coefficient C, the spring 17 having a spring constant $K_2$ ($K = 2$ to 3 Kgf/mm), and the tire (wheel) having a vertical spring coeffecient $K_3$ ($K_3 = 20$ to 40 Kgf/mm).

The operation is described.

Figure 3:
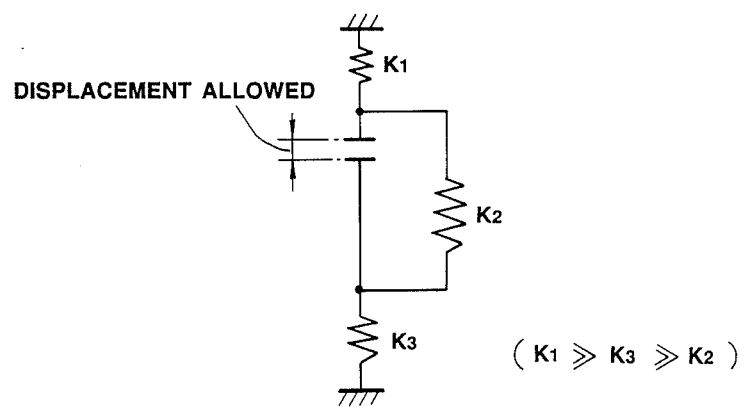
FIG. 3 is a kinetic model of the front suspension.
Figure 4:
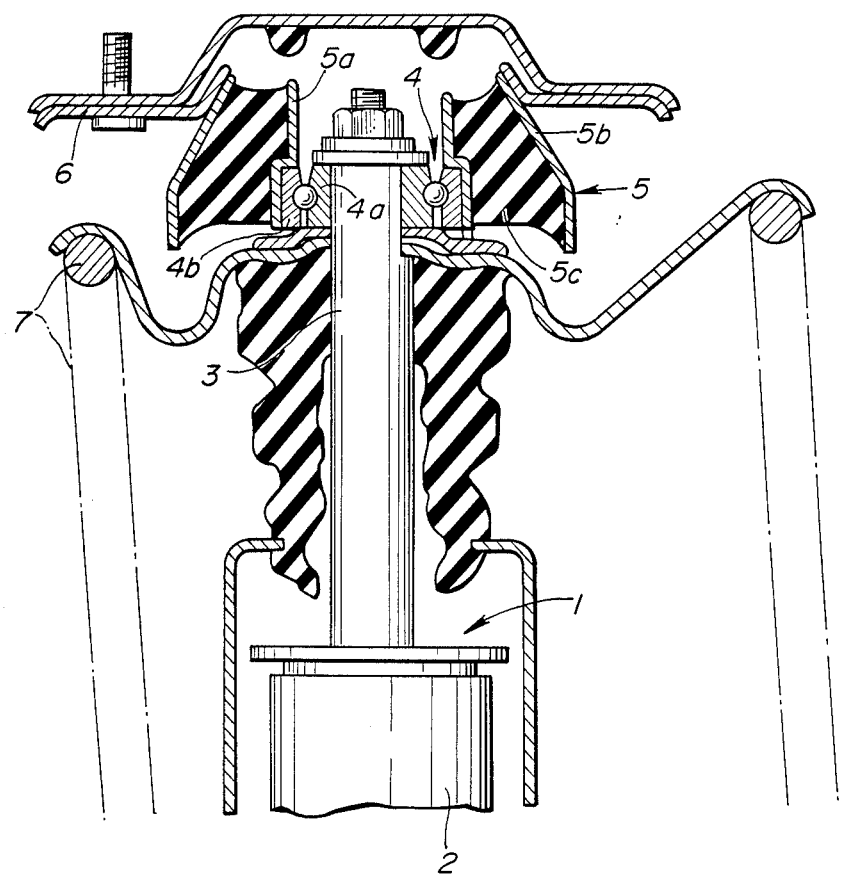
FIG. 4 is a fragementary sectional view of a front suspension according to the prior art discussed before.
Figure 5:
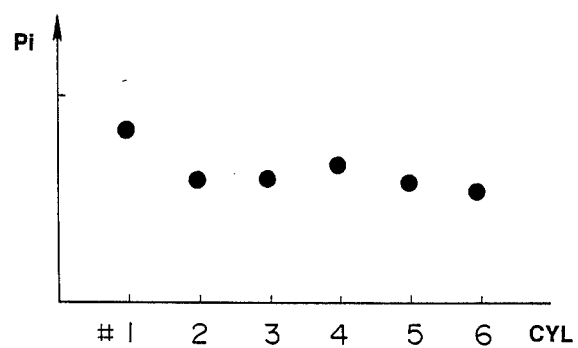
Figure 6:
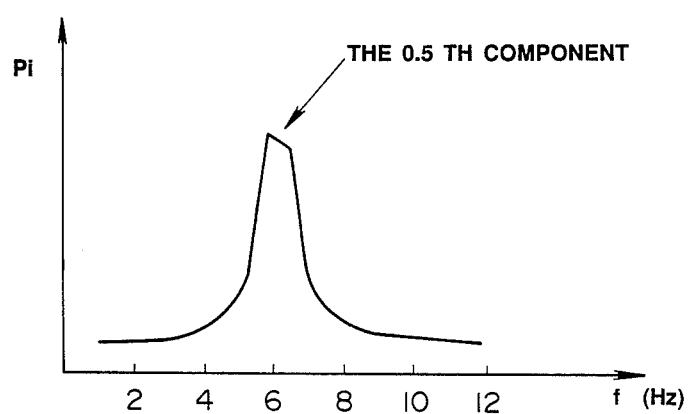
Figure 7:
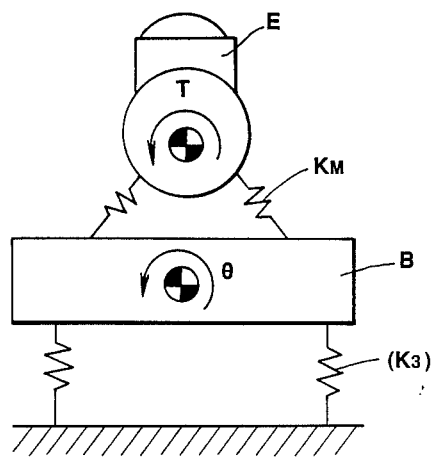
FIG. 7 is a kinetic model of the vehicle as a whole.
Figure 8:
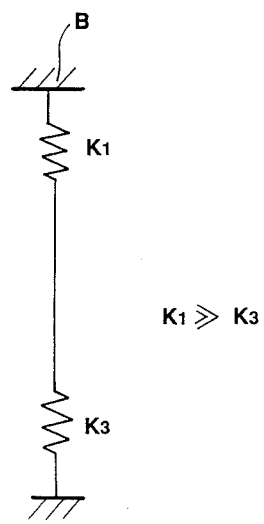
FIG. 8 is a kinetic model of the prior art when subjected to roll resonance.
Figure 9:
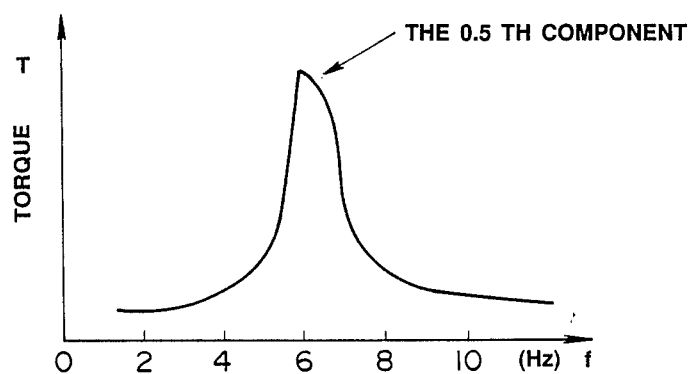
Figure 10:
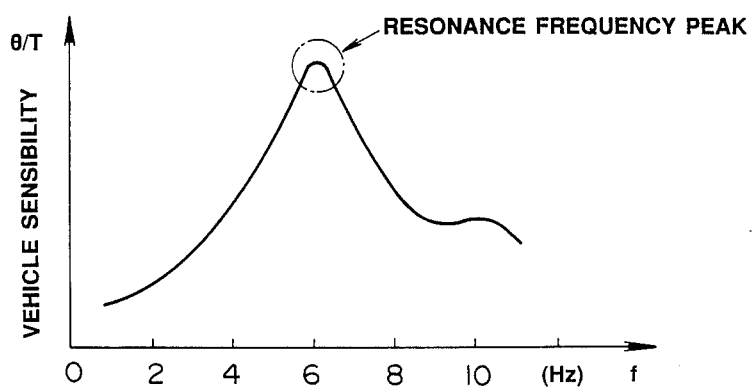

As shown in FIGS. 7 and 9, when the engine E generates a vibration inducing force with the 0.5 th order component of engine revolution speed at idling owing to irregular combustion therein, this vibration inducing force is applied as a roll input force to the vehicle body 15 (corresponding to vehicle body B), causing the vehicle body 15 to vibrate in a $\theta$ direction as shown in FIG. 7 with a vibration frequency of b 5 to 6 Hz. In this circumstance, since the piston rod 16 of the shock absorber 11 is in the sticked state, the kinetic model shown in FIG. 2 can be replaced with the kinetic model shown in FIG. 3. Besides, since owing to the engaging means 25, the mount insulator 13 and the piston rod 16 are engaged with each other for the relative displaceable manner, the spring constant K of the front suspension as a whole becomes generally equal to the spring constant $K_2$ of the spring 17 owing to the relationship between the spring constants $K_1$, $K_2$, and $K_3$, (namely, $K_1 > K_3 > K_2$). Therefore, as different distinguished from the conventional case where since the mount insulator 13 was linked to the piston rod 16 in the axially integral manner (refer to FIG. 8), the total spring constant of the whole suspension was generally equal to the vertical spring constant $K_3$ of the tire, according to the present invention, the relative displacement between the mount insulator 13 and the piston rod 16 is allowed by the spring 17 having the relatively small spring constant $K_2$, so that the roll resonance frequency of the vehicle body is determined by a ratio of the spring constant $K_3$ to the spring constant $K_2$ ($K_3/K = 5$ to 10) and becomes an optimum range of frequency from 2 to 3 Hz, which range has been lowered from the conventional resonance frequency range from 5 to 6 Hz. As a result, the roll resonance frequency range (2 to 3 Hz) of the vehicle body is now out of agreement with the vibration frequency range (5 to 6 Hz) of the vibration inducing force with the 0.5 th order component of engine revolution speed, thus suppressing any increase in the level of vibration of the vehicle body due to irregular combustion taking place in the engine when the engine idles.

As previously described, according to the present embodiment, the engaging means 25 engages the mount insulator 13 having the relatively large spring constant with the piston rod 16 in the axially displaceable manner, and thus the roll resonance frequency of the vehicle body is lowered since the spring 17 having the relatively small spring constant plays a main role in damping the axial displacement of the mount insulator 13 and the piston rod 16 upon receiving roll input from the engine, so that the roll resonance frequency of the vehicle body becomes out of agreement with the frequency of the vibration inducing force with the 0.5 th or component of engine revolution speed. As a result, the level of the vehicle body vibration when the engine idles is decreased.

Even though, according to the preceding embodiment, the engaging means 25 employs the initially coned disc spring 22, it is possible to modify the engaging means 25 by providing a gap having its width determined by taking the initial state of the spring 17 into account, thereby eliminating the use of the initially coned disc spring 22.

What is claimed is:

1. In a wheeled motor vehicle having a vehicle body, and front wheels, and a front suspension of the strut type operatively connected between a wheel support member for each of the front wheels and the vehicle body, the front suspension of the strut type comprising:
   a mount insulator on the vehicle body;
   a shock absorber having a lower end part linked to the wheel support member, and an upper end part telescopically received in said lower end part;
   a spring operatively disposed between the wheel support member and said mount insulator; and
   resilient means operatively connected between said upper end part of said shock absorber and said mount insulator for allowing a limited axial displacement of said upper end part relative to said mount insulator.

2. In a wheeled motor vehicle having a vehicle body, a front mount engine, and front wheels, and a front suspension of the strut type operatively connected between a wheel support member for each of the front wheels and the vehicle body, the front suspension of the strut type comprising:
   a mount insulator on the vehicle body;
   a shock absorber having a lower end part linked to the wheel support member, and an upper end part telescopically received in said lower end part;
   a spring operatively disposed between the wheel support member and said mount insulator; and
   means for engaging said upper end part with the mount insulator in such a manner as to allow a limited axial displacement of said upper end part relative to said mount insulator,
   wherein said engaging means include an initially coned disc spring operatively connected between said upper end part of said shock absorber and said mount insulator.

3. A wheeled motor vehicle as claimed in claim 1, wherein said mount insulator includes an outer sleeve fixedly secured to the vehicle body, an inner sleeve, and an elastic body loaded between said outer and inner sleeves, and wherein said resilient means include an initially coned disc spring connected between said upper end part of said shock absorber and said inner sleeve of said mount insulator.

4. In a wheeled motor vehicle having a vehicle body, a front mount engine, and front wheels, and a front suspension of the strut type operativly connected between a wheel support member for each of the front wheels and the vehicle body, the front suspension of the strut type comprising:
   a mount insulator on the vehicle body;
   a shock absorber having a lower end part linked to the wheel support member, and an upper end part telescopically received in said lower end part;
   a spring operatively disposed between the wheel support member and said mount insulator; and
   means for engaging said upper end part with the mount insulator in such a manner as to allow a limited 5. In a wheeled motor vehicle:
   a vehicle body;
   a wheel support with a wheel;
   a mount insulator including an outer sleeve fixedly secured to said vehicle body, an inner sleeve disposed in said outer sleeve, and an elastic body connected between said outer and inner sleeves;
   a spring operatively connected between said inner sleeve of said mount insulator and said wheel support;
   a shock absorber having one end portion connection to said wheel support and having an opposite end portion;
   means for providing a lost motion connection between said opposite end portion of said shock absorber and said inner sleeve of said mount insulator.

6. A wheeled motor vehicle as claimed in claim 5, wherein said lost motion connection providing means include an initially coned disc spring operatively connected between said upper end part of said shock abosorber and said inner sleeve of said mount insulator.

* * * * *